United States Patent
Cai et al.

(10) Patent No.: US 11,346,290 B2
(45) Date of Patent: May 31, 2022

(54) SPEED LIMITING FOR POWER TURBINE GOVERNING AND PROTECTION IN A TURBOSHAFT ENGINE

(71) Applicant: UNITED TECHNOLOGIES CORPORATION, Farmington, CT (US)

(72) Inventors: Chaohong Cai, Weatogue, CT (US); Richard P. Meisner, Glastonbury, CT (US); Timothy J. Crowley, Tolland, CT (US); David Lei Ma, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 180 days.

(21) Appl. No.: 16/797,572

(22) Filed: Feb. 21, 2020

(65) Prior Publication Data
US 2021/0262400 A1    Aug. 26, 2021

(51) Int. Cl.
   *F02C 9/28*    (2006.01)
(52) U.S. Cl.
   CPC .......... *F02C 9/28* (2013.01); *F05D 2220/329* (2013.01)
(58) Field of Classification Search
   CPC ........ F05D 2220/329; F02C 9/28; F02C 9/30; F02C 9/32; F02C 9/44; F03D 7/04; F03D 7/02; F01D 17/04
   See application file for complete search history.

(56) References Cited

U.S. PATENT DOCUMENTS

| | | | | |
|---|---|---|---|---|
| 5,509,265 A | * | 4/1996 | Benkosky | F02C 9/28 60/39.281 |
| 6,282,882 B1 | * | 9/2001 | Dudd, Jr | F02C 7/26 60/39.281 |
| 6,422,023 B1 | * | 7/2002 | Dudd, Jr | F02C 7/26 60/773 |
| 6,873,887 B2 | | 3/2005 | Zagranski et al. | |
| 2012/0116613 A1 | | 5/2012 | Daumas | |
| 2016/0069277 A1 | * | 3/2016 | Meisner | F02C 9/52 60/773 |
| 2016/0178464 A1 | | 6/2016 | Burns et al. | |
| 2016/0208639 A1 | * | 7/2016 | Cai | F01D 17/06 |

(Continued)

FOREIGN PATENT DOCUMENTS

| CN | 109854389 | 6/2019 |
|---|---|---|
| CN | 109896026 | 6/2019 |

OTHER PUBLICATIONS

European Patent Office, European Office Action dated Jul. 1, 2021 in Application No. 21157924.8.

(Continued)

*Primary Examiner* — Craig Kim
(74) *Attorney, Agent, or Firm* — Snell & Wilmer L.L.P.

(57) ABSTRACT

A control system for limiting a power turbine torque of a gas turbine engine is disclosed. In various embodiments, the control system includes an engine control module configured to output an effector command signal to a gas generator of the gas turbine engine; a power turbine governor module configured to output to the engine control module a power turbine torque request signal; and a power turbine torque limiter module configured to output to the power turbine governor module a power turbine speed rate signal to limit a power turbine speed overshoot of the gas turbine engine.

11 Claims, 4 Drawing Sheets

(56) References Cited

U.S. PATENT DOCUMENTS

| | | |
|---|---|---|
| 2016/0208717 A1* | 7/2016 | Cai .......................... F02C 9/54 |
| 2016/0281529 A1 | 9/2016 | Chen et al. |
| 2018/0030904 A1* | 2/2018 | Meunier ................... F02C 9/28 |
| 2018/0178908 A1 | 6/2018 | Taheri et al. |
| 2018/0306125 A1* | 10/2018 | Renold-Smith ........... F02C 9/46 |
| 2019/0309689 A1 | 10/2019 | Meisner et al. |
| 2019/0338754 A1* | 11/2019 | Cai ...................... F03D 7/0276 |

OTHER PUBLICATIONS

European Patent Office, European Search Report dated Oct. 26, 2021 in Application No. 21157924.8.

* cited by examiner

SPEED LIMITING FOR POWER TURBINE GOVERNING AND PROTECTION IN A TURBOSHAFT ENGINE

FIELD

The present disclosure relates to gas turbine engines and, more particularly, to systems and methods used to govern or limit the speed of power turbines powered by gas turbine engines.

BACKGROUND

Gas turbine engines typically include a compressor section, a combustor section and a turbine section arranged in series flow with an upstream inlet and a downstream exhaust. Air flows through the compressor section where it is compressed. The compressed air is then mixed with fuel and combusted in the combustor section, generating hot combustion gases. The hot combustion gases are then directed from the combustor section to the turbine section where power is extracted from the hot gases by causing a turbine to rotate.

A gas turbine engine may include one or more spools. For example, small-scale engines generally use a single-spool design with co-rotating compressor and turbine sections, while larger-scale engines generally use a multi-spool design with coaxially nested spools. The multiple spools may rotate in different directions and operate within different pressure, temperature and speed ranges. For instance, two-spool designs may include a high pressure spool (or a high spool) and a low pressure spool (or a low spool). The high pressure spool may include a high pressure turbine driving a high pressure compressor and the low pressure spool may include a low pressure turbine driving a low pressure compressor.

Turboshaft engines, which are a type of gas turbine engine typically used on helicopters, generally include a third spool called a power turbine spool. The power turbine spool couples a power turbine (or a free turbine) to an external load, such as, for example, a rotor of the helicopter. Helicopter flight maneuvers, which involve a change in collective pitch, rapidly change the load or power demand on the power turbine. However, in order to achieve ideal handling qualities for the airframe, a constant rotor speed is ideally maintained when delivering the requested change in power demand on the power turbine.

SUMMARY

A control system for limiting a power turbine torque of a gas turbine engine is disclosed. In various embodiments, the control system includes an engine control module configured to output an effector command signal to a gas generator of the gas turbine engine; a power turbine governor module configured to output to the engine control module a power turbine torque request signal; and a power turbine torque limiter module configured to output to the power turbine governor module a power turbine speed rate signal to limit a power turbine speed overshoot of the gas turbine engine.

In various embodiments, the power turbine speed rate signal includes a signal difference defined as a difference between a real-time power turbine speed signal and a desired power turbine speed reference signal. In various embodiments, the power turbine speed rate signal includes a power turbine torque rate limit value. In various embodiments, the power turbine speed rate signal includes a power turbine load signal received from a load system in communication with the gas turbine engine. In various embodiments, the power turbine speed rate signal includes a multiplication of the signal difference and the power turbine torque rate limit value. In various embodiments, the power turbine speed rate signal includes a division of the multiplication of the signal difference and the power turbine torque rate limit value by the power turbine load signal to generate a squared power turbine speed rate signal. In various embodiments, the power turbine speed rate signal includes a square root operation of the squared power turbine speed rate signal. In various embodiments, the signal difference is a value greater than or equal to zero. In various embodiments, the power turbine speed rate signal includes the power turbine torque rate limit value multiplied by an integer value equal to two.

In various embodiments, the engine control module is configured to receive a stability bleed signal. In various embodiments, the engine control module is configured to receive an inlet guide vane signal. In various embodiments, the power turbine speed rate signal includes a signal difference, defined as a difference between a real-time power turbine speed signal and a desired power turbine speed reference signal, multiplied by a power turbine torque rate limit value and divided by a power turbine load signal received from a load system in communication with the gas turbine engine to generate a squared power turbine speed rate signal. In various embodiments, the power turbine speed rate signal includes a square root operation of the squared power turbine speed rate signal.

A method for limiting a power turbine torque of a gas turbine engine is disclosed. In various embodiments, the method includes a processor receiving a collective lever angle command signal and a real-time power turbine speed signal; the processor generating a power turbine speed rate signal based at least in part on the collective lever angle command signal and the real-time power turbine speed signal; the processor generating a fuel flow signal and an inlet guide vane signal based at least in part on the power turbine speed rate signal; and the processor sending the fuel flow signal and the inlet guide vane signal to a gas generator of the gas turbine engine to limit the power turbine torque of the gas turbine engine.

In various embodiments, the method includes a sensor detecting a real-time power turbine speed, generating the real-time power turbine speed signal, and sending the real-time power turbine speed signal to the processor. In various embodiments, the method includes a sensor detecting a real-time power turbine torque, generating a real-time power turbine torque signal, and sending the real-time power turbine torque signal to the processor. In various embodiments, the method includes the processor generating a stability bleed signal based at least in part on the power turbine speed rate signal and sending the stability bleed signal to the gas generator of the gas turbine engine to control the power turbine torque of the gas turbine engine. In various embodiments, the power turbine speed rate signal includes a signal difference, defined as a difference between the real-time power turbine speed signal and a desired power turbine speed reference signal, multiplied by a power turbine torque rate limit value and divided by a power turbine load signal received from a load system in communication with the gas turbine engine to generate a squared power turbine speed rate signal.

A turboshaft engine for a helicopter is disclosed. In various embodiments, the turboshaft engine includes a gas generator; a power turbine disposed downstream of the gas generator; and a controller in communication with the gas generator and the power turbine, the controller including a processor configured to receive a collective lever angle command signal and a real-time power turbine speed signal, generate a power turbine speed rate signal based at least in part on the collective lever angle command signal and the real-time power turbine speed signal, generate a power turbine torque request signal based at least in part on the collective lever angle command signal and the real-time power turbine speed signal, generate a fuel flow signal and an inlet guide vane signal based at least in part on the power turbine speed rate signal, and send the fuel flow signal and the inlet guide vane signal to the gas generator in order to control a torque of the power turbine. In various embodiments, the power turbine speed rate signal includes a signal difference, defined as a difference between the real-time power turbine speed signal and a desired power turbine speed reference signal, multiplied by a power turbine torque rate limit value and divided by a power turbine load signal received from a load system in communication with the gas generator to generate a squared power turbine speed rate signal.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
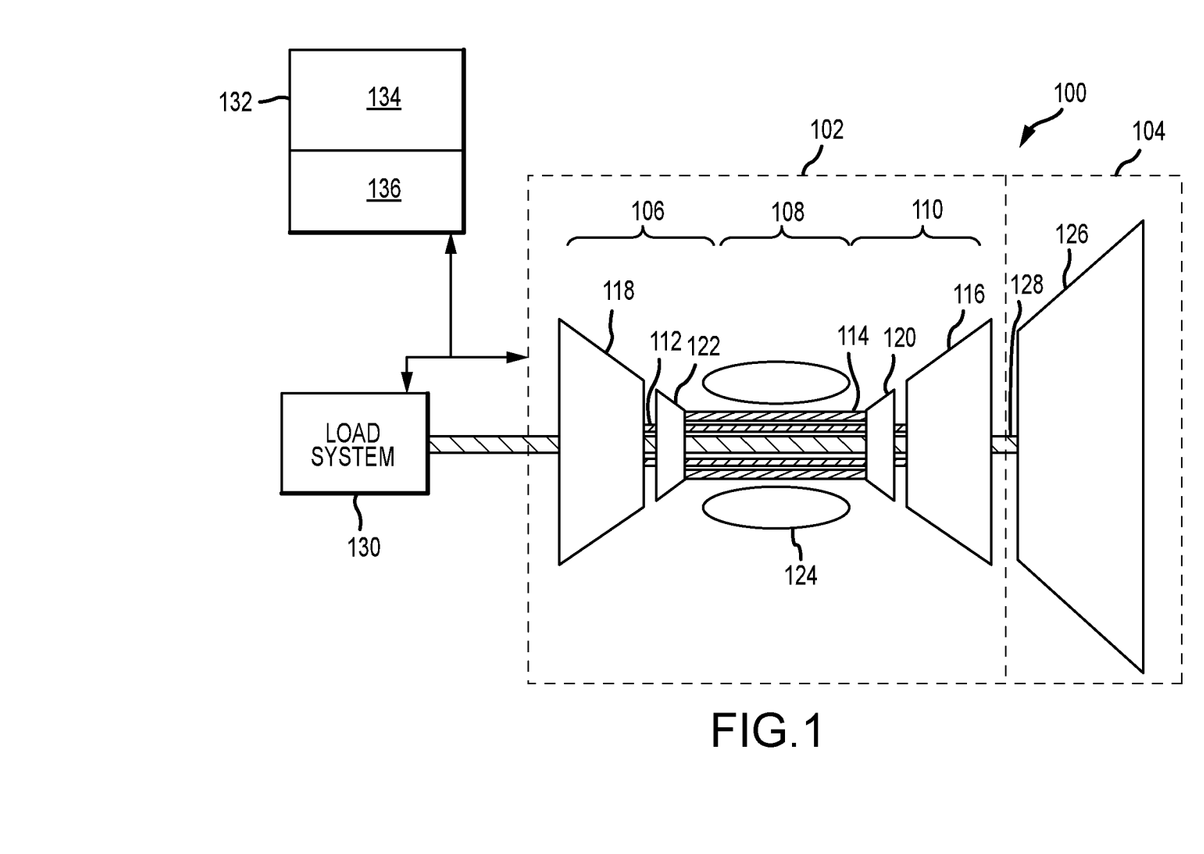
FIG. 1 is a schematic representation of a gas turbine engine and a power turbine, in accordance with various embodiments.

Referring now to the drawings, FIG. 1 illustrates a gas turbine engine 100, in accordance with various embodiments. The gas turbine engine 100 is configured as a turboshaft engine that may be used to drive a load, such as, for example, a rotor in a helicopter application or a power generator in a land-based application. In various embodiments, the gas turbine engine 100 comprises a gas generator section 102 (or a gas generator) and a power turbine section 104 (or a power turbine) arranged in a series flow configuration with an upstream inlet proximate the gas generator section 102 and a downstream exhaust proximate the power turbine section 104. In various embodiments, the gas generator section 102 includes a compressor section 106 where air is compressed, a combustor section 108 downstream of the compressor section 106 where the compressed air is mixed with fuel and ignited to generate hot combustion gases, and a turbine section 110 downstream of the combustor section 108 for extracting power from the hot combustion gases, such as by causing the blades of a turbine to rotate.

In various embodiments, the gas generator section 102 further comprises a low pressure spool 112 and a high pressure spool 114. In various embodiments, the low pressure spool 112 and the high pressure spool 114 are coaxially nested, rotate in different directions and operate within different pressure, speed and temperatures ranges. In various embodiments, a low pressure turbine 116 is mounted to the low pressure spool 112 to drive a low pressure compressor 118, and a high pressure turbine 120 is mounted to the high pressure spool 114 to drive a high pressure compressor 122. A combustor 124 receives a compressed air from the high pressure compressor 122 and combusts the compressed air with fuel to generate hot combustion gases, which are then expanded through the high pressure turbine 120 and the low pressure turbine 116.

In various embodiments, the power turbine section 104 comprises a power turbine 126 (or a free turbine) coupled to a power turbine spool 128 (or a free turbine spool). The power turbine 126 is mounted downstream of the low pressure turbine 116 and receives the hot combustion gases exiting the low pressure turbine 116. The hot combustion gases exiting the low pressure turbine 116 remain sufficiently energetic to drive the power turbine 126, which imparts a torque to the power turbine spool 128 that is used to drive a load system 130 (e.g., a rotor) that is also coupled to the power turbine spool 128. While the disclosure sometimes focuses on the load system comprising a rotor for a helicopter, the disclosure contemplates various other load systems, such as, for example, an electrical generator, a propeller, a pump or similar components that may be driven by a gas turbine engine.

In various embodiments, the gas turbine engine 100 and the load system 130 are in communication with one another and with a controller 132 configured to control operation of the gas turbine engine 100. In various embodiments, the controller 132 comprises a Full Authority Digital Engine Control (FADEC) system. In various embodiments, the controller 132 includes a processor 134 (or a plurality of processors) and a tangible, non-transitory memory 136 (or a plurality of tangible, non-transitory memories) configured to implement digital or programmatic logic. In various embodiments, for example, the processor 134 comprises one or more of an application specific integrated circuit (ASIC), a digital signal processor (DSP), a field programmable gate array (FPGA), a general purpose processor or some other programmable logic device, discrete gate, transistor logic, or discrete hardware component, and the tangible, non-transitory memory 136 is configured to store instructions that are implemented by the processor 134 for performing various functions, such as the systems and methods described herein.

Figure 2A:
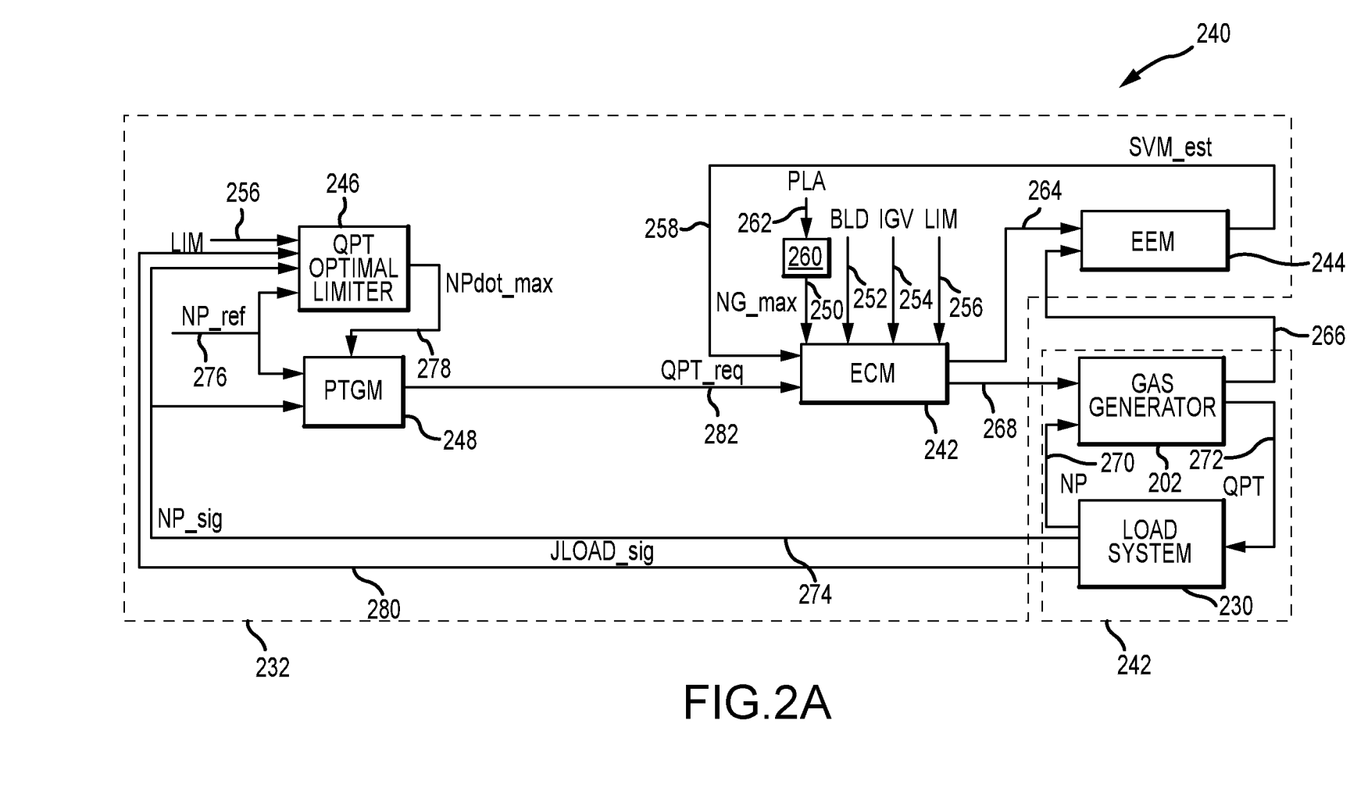
FIG. 2A is a schematic representation of a power turbine control system for a gas turbine engine, in accordance with various embodiments.

Referring now to FIG. 2A, a power turbine control system 240 for a gas turbine engine, such as, for example, the gas turbine engine 100 described above with reference to FIG. 1, is illustrated. In various embodiments, the power turbine control system 240 includes a controller 232, similar to the controller 132 described above, and a plant 233, which comprises a gas generator 202 and a load system 230, similar, respectively, to the gas generator within the gas generator section 102 and the load system 130 described above with reference to FIG. 1. The power turbine control system 240 is configured to output one or more engine control commands to one or more components of the gas generator 202. In various embodiments, the controller 232 comprises one or more processors that include an engine control module (ECM) 242, an engine estimation module (EEM) 244, a power turbine torque limiter module (QPT limiter) 246 (or a power turbine torque optimal limiter module) and a power turbine governor module (PTGM) 248. The load system 230 includes a sensor 231 (or a plurality of sensors) for detecting a real-time power turbine speed and a real-time power turbine torque and generating a real-time power speed signal and a real-time power turbine torque signal.

Still referring to FIG. 2A, the ECM 242 is configured to receive various inputs, including a maximum generator speed signal (NG_max) 250; a stability bleed signal (BLD) 252 (e.g., signals concerning a relative positioning of bleed valves between the low pressure compressor 118 and the high pressure compressor 122 described above with reference to FIG. 1); an inlet guide vane signal (IGV) 254 (e.g., signals concerning a relative positioning of the inlet guide vanes or the stator vanes of the low pressure compressor 118 and the high pressure compressor 122); engine limit constraints (LIM) 256 (e.g., signals concerning acceleration, pressure, speed, stall and temperature parameter for the gas generator 202); and state variable model estimates (SVM_est) 258 of various engine state variables, such as, for example, pressure ($P_e$), speed ($N_e$), temperature ($T_e$) and thrust ($F_e$), from the EEM 244. Referring generally, the BLD signal 252 and the IGV signal 254 are adjusted or scheduled as a function of a corrected compressor speed in order to operate within a compressor stability margin.

In various embodiments, a power rating module 260 is configured to receive a power lever angle (PLA) signal 262, which is used to generate the NG_max signal 250 as an input to the ECM 242. In various embodiments, the speed of the gas generator 202 is a function of the PLA signal 262. In various embodiments, the power rating module 260 is configured to, for example, utilize a look-up table in order to generate the NG_max signal 250 based on the PLA signal 262. In various embodiments, the SVM_est 258 is output from the EEM 244 and input into the ECM 242. In various embodiments, the EEM 244 receives an output signal 264 from the ECM 242 and an output signal 266 from the gas generator 202. In various embodiments, the output signal 266 from the gas generator 202 is in the form of real-time output measurement signals, such as, for example, pressure ($P_m$), speed ($N_m$), temperature ($T_m$) and thrust ($F_m$) signals.

In various embodiments, the gas generator 202 receives an effector command signal 268 from the ECM 242. The effector command signal 268 comprises operational data, such as, for example, a fuel flow signal (WF) request, the BLD signal 252, and the IGV signal 254. The gas generator 202 also receives a load output signal 270 from the load system 230. The load output signal 270 comprises load data, such as, for example, a power turbine speed (NP) signal of the power turbine 126 described above with reference to FIG. 1. In various embodiments, the load system 230 receives an output signal 272 from the gas generator 202 as an input into the load system 230, such as a power turbine torque (QPT) of the power turbine 126.

In various embodiments, the PTGM 248 receives a first real-time output signal 274 from the load system 230 as an input, such as, for example, a real-time power turbine speed signal (NP_sig) of the power turbine 126. The PTGM 248 also receives an input signal 276, such as, for example, a desired power turbine speed reference signal (NP_ref) of the power turbine 126. The input signal 276 is received, for example, from an avionics or cockpit unit of an aircraft. The PTGM 248 also receives an output signal 278 from the QPT limiter 246 as an input, such as, for example, a power turbine speed rate signal (NPdot_max) (or a maximum power turbine speed rate signal), which is the maximum rate of increase of the speed of the power turbine 126. The output signal 278 from the QPT limiter 246 is discussed further below with reference to FIG. 2B, but is based, at least in part, on the first real-time output signal 274 from the load system 230, a second real-time output signal 280 from the load system 230, such as, for example, a power turbine load signal (JLoad_sig), representing the inertia of the power turbine 126 and the rotor load, the input signal 276 comprising the desired power turbine speed reference signal (NP_ref) for the power turbine 126, a collective lever angle command signal 247, and the LIM constraints 256. Based on the various inputs just described, the PTGM 248 calculates an output signal 282, such as, for example, a power turbine torque request signal (QPT_req) that is provided as an input to the ECM 242.

Figure 2B:
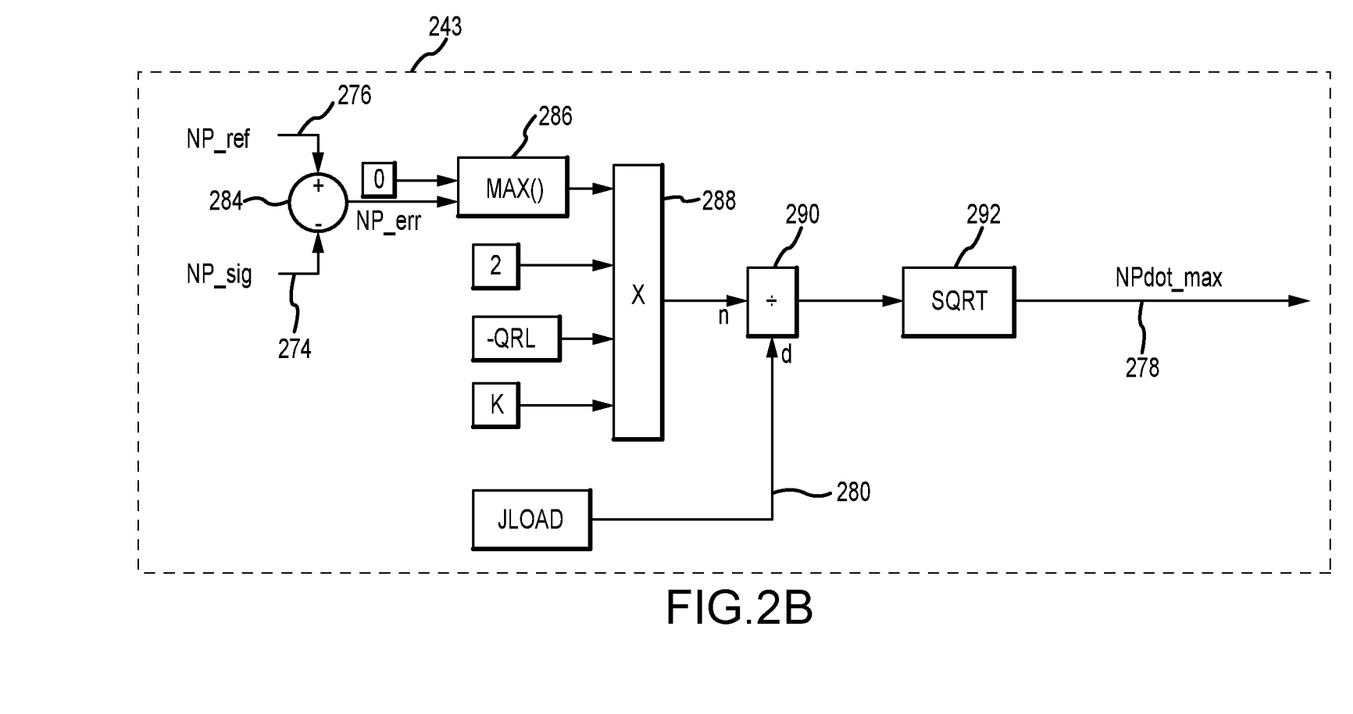
FIG. 2B is a functional representation of a power turbine torque optimal limiter, in accordance with various embodiments.

Referring now to FIG. 2B, a functionality of the QPT limiter 246 is illustrated and described. More specifically, the first real-time output signal 274 and the input signal 276 are input into a subtraction node 284 within the QPT limiter 246 to produce a signal difference (NP_err), representing a difference between the first real-time output signal 274 subtracted from the input signal 276. The signal difference (NP_err) is then compared against a baseline of zero to determine if the signal difference (NP_err) is a negative or a positive number. A max function node 286 then outputs NP_err or zero to a multiplier node 288, depending on whether NP_err is greater than or less than zero, respectively. Four numbers, including NP_err (or zero), an integer value equal to two (2), a scaling constant (K), which is generally on the order of unity, and a power turbine torque rate limit value (−QRL), are then multiplied by the multiplier node 288 to generate a numerator (n=NP_err (or zero)*2*K*(−QRL)) that is input to a divider node 290. The divider node 290 then divides the numerator (n) by a denominator (d=JLOAD_sig) to generate a signal (n/d) representing the square of the output signal 278, i.e., the square of the power turbine speed rate signal (NPdot_max).

The signal (n/d) representing the square of the output signal 278 is then passed to a square root node 292, which generates the output signal 278, i.e., the power turbine speed rate signal (NPdot_max).

In various embodiments, the power turbine speed rate signal (NPdot_max) ensures minimal, near-zero or zero power turbine speed overshoot. In essence, the signal serves as a boundary condition to constrain torque, limit power turbine speed and minimize speed excursions during aggressive or large power transients, such as when the gas turbine engine 100 described above with reference to FIG. 1 is powered on, powered off or transitioning between idle and fly modes. Without such power or torque protection, the power turbine governing may accelerate components of the load system 230 (e.g., a helicopter rotor) to over-speed situations, resulting in damage to the load system 230 or inefficient operation. Thus, in various embodiments, the power turbine speed rate signal (NPdot_max) enables smaller rotor excursion during fast load changes, increases flight handling quality and performance at various power levels, and integrates with an airframe during load changes.

Figure 3:
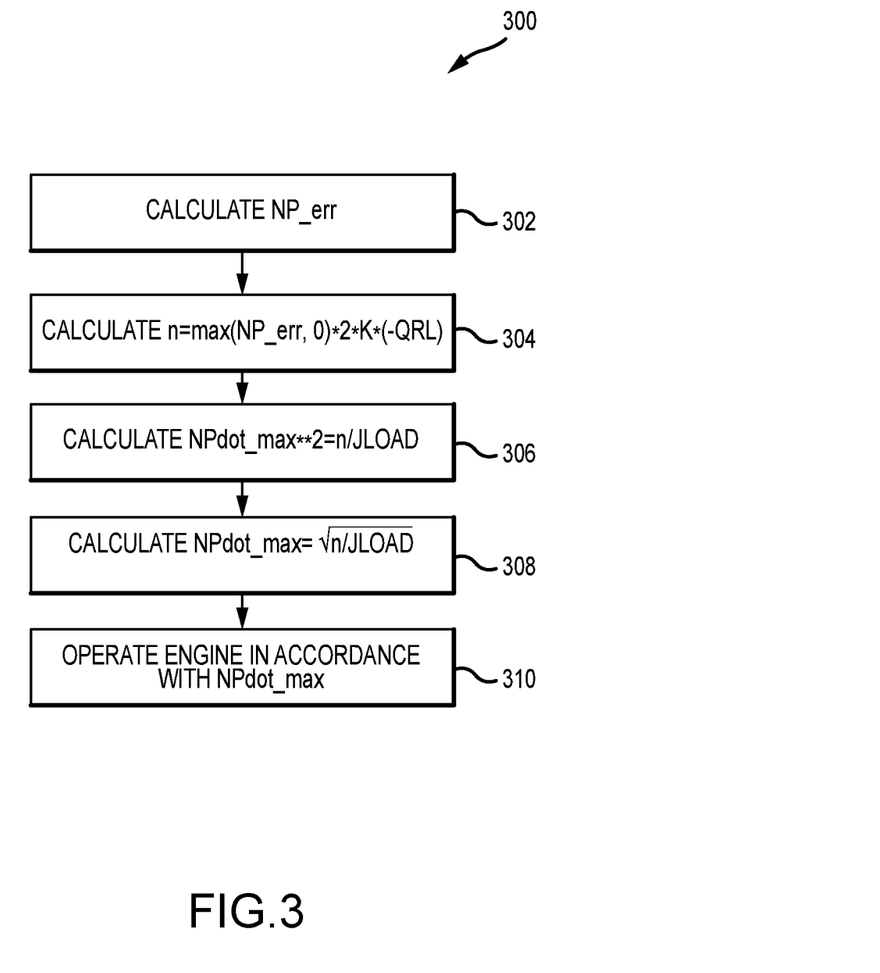
FIG. 3 describes a method of governing the speed of a power turbine, in accordance with various embodiments.

Referring now to FIG. 3, a method 300 for limiting a power turbine torque of a gas turbine engine is described, in accordance with various embodiments. Similar to the description above with reference to FIG. 2, a first step 302 includes calculating a signal difference (NP_err), representing a difference between the first real-time output signal 274 subtracted from the input signal 276. A second step 304 includes calculating through a multiplication a numerator (n=max (NP_err, 0)*2*K*(-QRL)). A third step 306 includes calculating through a division a squared power turbine speed rate signal (NPdot_max2=n/JLOAD). A fourth step 308 includes calculating through a square root operation the power turbine speed rate signal (NPdot_max=(n/JLOAD)½). A fifth step 310 includes operating the engine in accordance with NPdot_max. In accordance with the method 300, a gas generator of a gas turbine engine controls a maximum torque output of a power turbine connected to a load, such as, for example, a rotor.

In various embodiments, the present disclosure provides a power turbine control system for a gas turbine engine, such as a turboshaft engine used in an aircraft or helicopter application. The disclosed systems and methods enable the gas turbine engine to deliver a requested change in power demand during flight maneuvers, while, at the same time, minimizing power turbine speed excursion caused by overshooting rotor speeds at various power levels. In various embodiments, a technical effect of the power turbine control system is to meet power demands under various engine operation limits. In operation, the disclosed systems and methods minimize overshooting rotor speed during changes in load or power demands, which can smooth transitions between rotor states and improve integration among different airframe states and operating conditions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A control system for limiting a power turbine torque of a gas turbine engine, comprising:
   an engine control module configured to output an effector command signal to a gas generator of the gas turbine engine;
   a power turbine governor module configured to output to the engine control module a power turbine torque request signal; and
   a power turbine torque limiter module configured to output to the power turbine governor module a power turbine, speed rate signal to limit a power turbine speed overshoot of the gas turbine engine,
      wherein the power turbine speed rate signal includes a signal difference, defined as a difference between a real-time power turbine speed signal and a desired power turbine speed reference signal, multiplied by a power turbine torque rate limit value and divided by a power turbine load signal received from a load system in communication with the gas generator to generate a squared power turbine speed rate signal.

2. The control system of claim 1 wherein the power turbine speed rate signal includes a square root operation of the squared power turbine speed rate signal.

3. The control system of claim 2, wherein the signal difference is a value greater than or equal to zero.

4. The control system of claim 3, wherein the power turbine speed rate signal includes the power turbine torque rate limit value multiplied by an integer value equal to two.

5. The control system of claim 1, wherein the engine control module is configured to receive a stability bleed signal.

6. The control system of claim 5, wherein the engine control module is configured to receive an inlet guide vane signal.

7. A method for limiting a power turbine torque of a gas turbine engine, comprising:
   a processor receiving a collective lever angle command signal and a real-time power turbine speed signal;
   the processor generating a power turbine speed rate signal based at least in part on the collective lever angle command signal and the real-time power turbine speed signal;
   the processor generating a fuel flow signal and an inlet guide vane signal based at least in part on the power turbine speed rate signal; and
   the processor sending the fuel flow signal and the inlet guide vane signal to a gas generator of the gas turbine engine to limit the power turbine torque of the gas turbine engine,
      wherein the power turbine speed rate signal includes a signal difference, defined as a difference between the real-time power turbine speed signal and a desired power turbine speed reference signal, multiplied by a power turbine torque rate limit value and divided by a power turbine load signal received from a load system in communication with the gas generator to generate a squared power turbine speed rate signal.

8. The method of claim 7, further comprising a sensor detecting a real-time power turbine speed, generating the real-time power turbine speed signal, and sending the real-time power turbine speed signal to the processor.

9. The method of claim 7, further comprising a sensor detecting a real-time power turbine torque, generating a real-time power turbine torque signal, and sending the real-time power turbine torque signal to the processor.

10. The method of claim 7, further comprising the processor generating a stability bleed signal based at least in part on the power turbine speed rate signal and sending the stability bleed signal to the gas generator of the gas turbine engine to control the power turbine torque of the gas turbine engine.

11. A turboshaft engine for a helicopter, comprising:
   a gas generator;
   a power turbine disposed downstream of the gas generator; and
   a controller in communication with the gas generator and the power turbine, the controller including a processor configured to
      receive a collective lever angle command signal and a real-time power turbine speed signal,
      generate a power turbine speed rate signal based at least in part on the collective lever angle command signal and the real-time power turbine speed signal,
      generate a power turbine torque request signal based at least in part on the collective lever angle command signal and the real-time power turbine speed signal,
      generate a fuel flow signal and an inlet guide vane signal based at least in part on the power turbine speed rate signal, and send the fuel flow signal and the inlet guide vane signal to the gas generator in order to control a torque of the power turbine,
      wherein the power turbine speed rate signal includes a signal difference, defined as a difference between the real-time power turbine speed signal and a desired power turbine speed reference signal, multiplied by a power turbine torque rate limit value and divided by a power turbine load signal received from a load system in communication with the gas generator to generate a squared power turbine speed rate signal.

* * * * *